(12) United States Patent
Baladhandapani et al.

(10) Patent No.: US 11,289,094 B2
(45) Date of Patent: Mar. 29, 2022

(54) SYSTEM AND METHOD FOR ASSISTING PILOT THROUGH CLEARANCE PLAYBACK

(71) Applicant: HONEYWELL INTERNATIONAL INC., Morris Plains, NJ (US)

(72) Inventors: Gobinathan Baladhandapani, Madurai (IN); Sivakumar Kanagarajan, Bangalore (IN); Mahesh Kumar Sampath, Madurai (IN); Hariharan Saptharishi, Madurai (IN); Kiran Krishna, Bangalore (IN); Chaya Garg, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 127 days.

(21) Appl. No.: 16/879,383

(22) Filed: May 20, 2020

(65) Prior Publication Data
US 2021/0312927 A1  Oct. 7, 2021

(30) Foreign Application Priority Data
Apr. 1, 2020  (IN) .......................... IN202011014542

(51) Int. Cl.
*G10L 15/00* (2013.01)
*G10L 15/26* (2006.01)
(Continued)

(52) U.S. Cl.
CPC .............. *G10L 15/26* (2013.01); *B64D 43/00* (2013.01); *G08G 5/0013* (2013.01); *G10L 15/02* (2013.01);
(Continued)

(58) Field of Classification Search
CPC ...... B64D 43/00; G08G 5/0013; G10L 15/02; G10L 15/08; G10L 15/26; G10L 2015/088
(Continued)

(56) References Cited

U.S. PATENT DOCUMENTS 5,961,331 A * 10/1999 Fisch .................... G09B 19/165
434/219
6,160,497 A * 12/2000 Clark ........................ G01S 7/04
340/945
(Continued)

FOREIGN PATENT DOCUMENTS

FR  3009759 A1  2/2015
FR  3032574 A1  8/2016

*Primary Examiner* — Khai N. Nguyen
(74) *Attorney, Agent, or Firm* — Lorenz & Kopf, LLP (57) ABSTRACT

Systems and methods are provided for playback clearance assistance, the system includes a processing system configured to: in response to receipt of a voice clearance communication comprising a clearance message, decode the clearance message to identify features contained within the clearance message related to a command instruction or clearance data for a flight; determine, at least one applicable clearance message amendment solution for use to amend the clearance message from a set of applicable clearance message amendment solutions wherein the applicable clearance amendment solution is determined based on keywords retrieved from a plurality of databases comprising at least contextual and prior clearance message data; and apply the applicable clearance message amendment solution to append keywords to the clearance message to generate an appended clearance message that reduces ambiguity in the clearance message resulting from at least missing value data, non-standard terminology or incomplete message information.

20 Claims, 4 Drawing Sheets

(51) Int. Cl.
*G10L 15/02* (2006.01)
*G08G 5/00* (2006.01)
*B64D 43/00* (2006.01)
*G10L 15/08* (2006.01)

(52) U.S. Cl.
CPC ........ *G10L 15/08* (2013.01); *G10L 2015/088* (2013.01)

(58) Field of Classification Search
USPC ........................................................ 704/235
See application file for complete search history.

(56) References Cited

U.S. PATENT DOCUMENTS

| | | | |
|---|---|---|---|
| 6,175,314 B1 * | 1/2001 | Cobley | G08G 5/0013 340/945 |
| 7,881,832 B2 * | 2/2011 | Komer | G08G 5/0021 701/3 |
| 8,831,677 B2 * | 9/2014 | Villa-Real | H04L 63/0861 455/552.1 |
| 8,983,761 B2 * | 3/2015 | Smith | G08G 5/0026 701/120 |
| 9,299,340 B2 * | 3/2016 | Kar | G10L 15/22 |
| 9,430,949 B1 * | 8/2016 | Nelson | G08G 5/065 |
| 9,620,020 B2 * | 4/2017 | Wang | G06F 3/16 |
| 9,620,119 B2 * | 4/2017 | Bilek | G10L 15/22 |
| 10,037,702 B1 * | 7/2018 | Kashi | G08G 5/0039 |
| 10,102,760 B1 | 10/2018 | Foltan et al. | |
| 10,157,617 B2 * | 12/2018 | Shamasundar | G08G 5/0013 |
| 10,275,427 B2 * | 4/2019 | Saptharishi | G06F 3/0482 |
| 10,297,159 B2 * | 5/2019 | Srivastav | G06T 17/05 |
| 10,446,039 B2 * | 10/2019 | Shamasundar | G08G 5/025 |
| 10,991,373 B1 * | 4/2021 | Wang | G10L 17/24 |
| 2006/0023849 A1 * | 2/2006 | Timmins | H04M 3/4936 379/88.19 |
| 2006/0287786 A1 * | 12/2006 | Todd | G11B 20/10527 701/33.4 |
| 2007/0215745 A1 | 9/2007 | Fleury et al. | |
| 2008/0221886 A1 | 9/2008 | Colin et al. | |
| 2010/0030400 A1 * | 2/2010 | Komer | G10L 15/26 701/3 |
| 2014/0039734 A1 * | 2/2014 | Ramaiah | G08G 5/0021 701/14 |
| 2014/0129218 A1 * | 5/2014 | Liu | G10L 15/32 704/231 |
| 2014/0162598 A1 * | 6/2014 | Villa-Real | G06Q 20/363 455/411 |
| 2014/0195139 A1 * | 7/2014 | Smith | G08G 5/0013 701/120 |
| 2014/0244246 A1 | 8/2014 | Nutaro et al. | |
| 2015/0073790 A1 * | 3/2015 | Steuble | G10L 15/26 704/235 |
| 2015/0081292 A1 | 3/2015 | Populus et al. | |
| 2015/0100311 A1 * | 4/2015 | Kar | G08G 5/0013 704/231 |
| 2015/0162001 A1 | 6/2015 | Kar et al. | |
| 2016/0034250 A1 * | 2/2016 | McCullough | G10L 15/22 704/275 |
| 2016/0093302 A1 * | 3/2016 | Bilek | G10L 15/22 704/235 |
| 2016/0155435 A1 | 6/2016 | Mohideen | |
| 2016/0379640 A1 * | 12/2016 | Joshi | G10L 15/22 704/235 |
| 2017/0039858 A1 * | 2/2017 | Wang | G08G 5/0013 |
| 2018/0129635 A1 * | 5/2018 | Saptharishi | G06F 3/04817 |
| 2018/0174595 A1 | 6/2018 | Dirac et al. | |
| 2018/0189691 A1 * | 7/2018 | Oehrle | G06Q 10/063 |
| 2018/0233052 A1 * | 8/2018 | Shamasundar | G08G 5/0013 |
| 2018/0268718 A1 * | 9/2018 | Srivastav | G10L 15/26 |
| 2018/0277116 A1 * | 9/2018 | Shamasundar | G08G 5/0013 |
| 2019/0206393 A1 * | 7/2019 | Fang | G06N 5/04 |
| 2019/0221126 A1 * | 7/2019 | Srinivasan | G08G 5/0013 |
| 2019/0244528 A1 * | 8/2019 | Srinivasan | G08G 5/0021 |
| 2019/0251965 A1 * | 8/2019 | Dharne | G06F 3/167 |
| 2019/0251966 A1 * | 8/2019 | Dharne | G06K 9/00302 |
| 2019/0381977 A1 * | 12/2019 | Kanagarajan | B60T 8/1703 |
| 2019/0392718 A1 * | 12/2019 | Turner | G08G 5/0021 |
| 2020/0066180 A1 * | 2/2020 | Baldwin | G10L 15/26 |
| 2021/0295710 A1 * | 9/2021 | Saptharishi | G10L 15/26 |
| 2021/0312927 A1 * | 10/2021 | Baladhandapani | B64D 43/00 |

\* cited by examiner

SYSTEM AND METHOD FOR ASSISTING PILOT THROUGH CLEARANCE PLAYBACK

CROSS REFERENCE TO RELATED APPLICATION

This application claims priority to Indian Provisional Patent Application No. 202011014542, filed Apr. 1, 2020, the entire content of which is incorporated by reference herein.

TECHNICAL FIELD

The subject matter described herein relates generally to vehicle systems, and more particularly, embodiments of the subject matter relate to avionics systems and methods to playback radio communications and use of speech technology to transcribe and display radio communications in real-time to reduce communication errors caused by accent unfamiliarity, non-standard phraseology usage, and incomplete or indirect information provided.

BACKGROUND

Reducing the likelihood of aviation communication errors is important to ensure continued safe flight operations. The potential for Air Traffic Controller (ATC) to pilot communication errors may be caused by various factors including the accent of the person speaking (ATC or pilot) that the recipient of the communication finds difficult to understand; the use of non-standard phraseology in the communications; and communications which have an indirect reference or are incomplete when communicated by the originator whether it is the ATC or the pilot.

It is therefore desirable to provide aircraft systems and methods that eliminate or at least reduce the potential for accent unfamiliarity issues in-flight communications between two or multiple parties (i.e. the pilot and the ATC). Also, it is desirable to provide systems and methods that reduce the potential for errors in flight operations and instructions, or that reduce the risk of such potential error in communications that result from the use of non-standard phraseology between parties in the communications. Finally, it is desirable to provide systems and methods that assist in the receiving communicated party by filling in blanks (i.e. to enable more complete communications) from indirect references or incomplete information communicated between parties.

Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a computer-implemented method of detecting a potential ambiguity in a sequence of communications is provided. The method involves obtaining a clearance communication associated with a first source of the communication (such as an aircraft, an air traffic control system, or the like), obtaining another clearance communication associated with a different source (such as another aircraft), identifying a first conversational context associated with the first clearance communication, identifying a second conversational context associated with the second clearance communication, identifying a discrepancy between the clearance communications associated different sources based at least in part on the first and second conversational contexts, and in response to identifying the discrepancy, generating a user notification at one or more of the first source and the second source.

In another embodiment, a method of detecting a potential ambiguity in a sequence of communications involves receiving, at a first aircraft, a first clearance communication associated with a second aircraft different from the first aircraft, obtaining, at the first aircraft, a second clearance communication associated with the first aircraft, and determining, at the first aircraft, the first clearance communication is related to the second clearance communication based at least in part on a relationship between a first conversational context associated with the first clearance communication and a second conversational context associated with the second clearance communication. In response to determining the first clearance communication is related to the second clearance communication, the method continues by comparing, at the first aircraft, one or more fields associated with the first clearance communication with the one or more fields associated with the second clearance communication to identify a discrepancy between the first value for a first field (e.g., a runway, waypoint, altitude, heading, speed, or the like) of the one or more fields associated with the first clearance communication and a second value for a second field of the one or more fields associated with the second clearance communication and generating a user notification at the first aircraft in response to identifying the discrepancy.

An embodiment of an aircraft system is also provided. The aircraft system includes a communications system to obtain a plurality of clearance communications, a data storage element to maintain a table of entries corresponding to respective clearance communications of the plurality of clearance communications, a user interface, and a processing system coupled to the data storage element, the user interface and the communications system. The processing system is configurable to assign a conversational context corresponding to each respective clearance communication of the plurality of clearance communications to each respective entry in the table of entries, identify a discrepancy between a first entry associated with a first clearance communication of the plurality of clearance communications and a second entry associated with a second clearance communication of the plurality of clearance communications based at least in part on a first conversational context assigned to the first entry and a second conversational context assigned to the second entry, and generate a user notification via the user interface in response to the discrepancy.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the subject matter of the application and uses thereof. Furthermore, there is no intention to be bound by any theory presented in the preceding background, brief summary, or the following detailed description.

The Air Traffic Controller (ATC) is typically involved with voice communications between a pilot or crewmember onboard the various aircraft within controlled airspace. The ATC and the pilot are often in constant communication over a Voice Channel or the CPDLC through the course of the flight. The ground to air communications includes clearance, information or requests for message elements. The ATC to pilot communications have several limitations including but not restricted to miscommunication, transmission errors, misinterpreted voice instructions, ambiguous communications, non-standard phraseology that can cause an increased pilot overload of operational tasks when listening to ATC in the amidst flying the aircraft.

In various exemplary embodiments, the present disclosure describes methods and systems that automatically recommend and playback a clearance or communication to the pilot or other flight personnel in an accent type by recognizing the pilot's voice interactions with ATC and/or a co-Pilot.

In various exemplary embodiments, the present disclosure describes methods and system that take into account the ATC Voice communication and a pilot's preferred accent and/or language for voice communications as input and enables the playback of clearance or other communication to the pilot in the pilot's preferred accent and/or language.

In various exemplary embodiments, the present disclosure describes methods and systems that may process incoming radio communications to isolate various ownship clearances and to remove non-standard phraseology from a transcribed text and replace the non-standard phraseology with more standard used phraseology to assist the pilot with completing a clearance instruction. Also, audio of the corresponding original spoken clearance is available for review by the pilot.

In various exemplary embodiments, the present disclosure describes methods and systems that add or augment missing information by replacing incomplete and/or ambiguous communicated information and/or indirect references in clearance instructions. The methods and system include a voice-activated flight deck that enables speech recognition or brings a speech recognition system into the cockpit. The method and system are capable of command and control and transcribing the ATC conversations.

Various exemplary embodiments described by the disclosure enable reductions of a pilot's workload by filling in ambiguous information and enabling playback of communications in an accent that the pilot can better understand. Various exemplary embodiments described enabling the reduction of frequency congestion by lessening the need for pilot-ATC to make repeated requests for clearance communications. Other benefits may include to existing and planned cockpit functionality such as the playback of radio communications and real-time transcription of radio communications which are more contextual and intelligent.

For purposes of explanation, the subject matter is primarily described herein in the context of aircraft operating in controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

Figure 1:
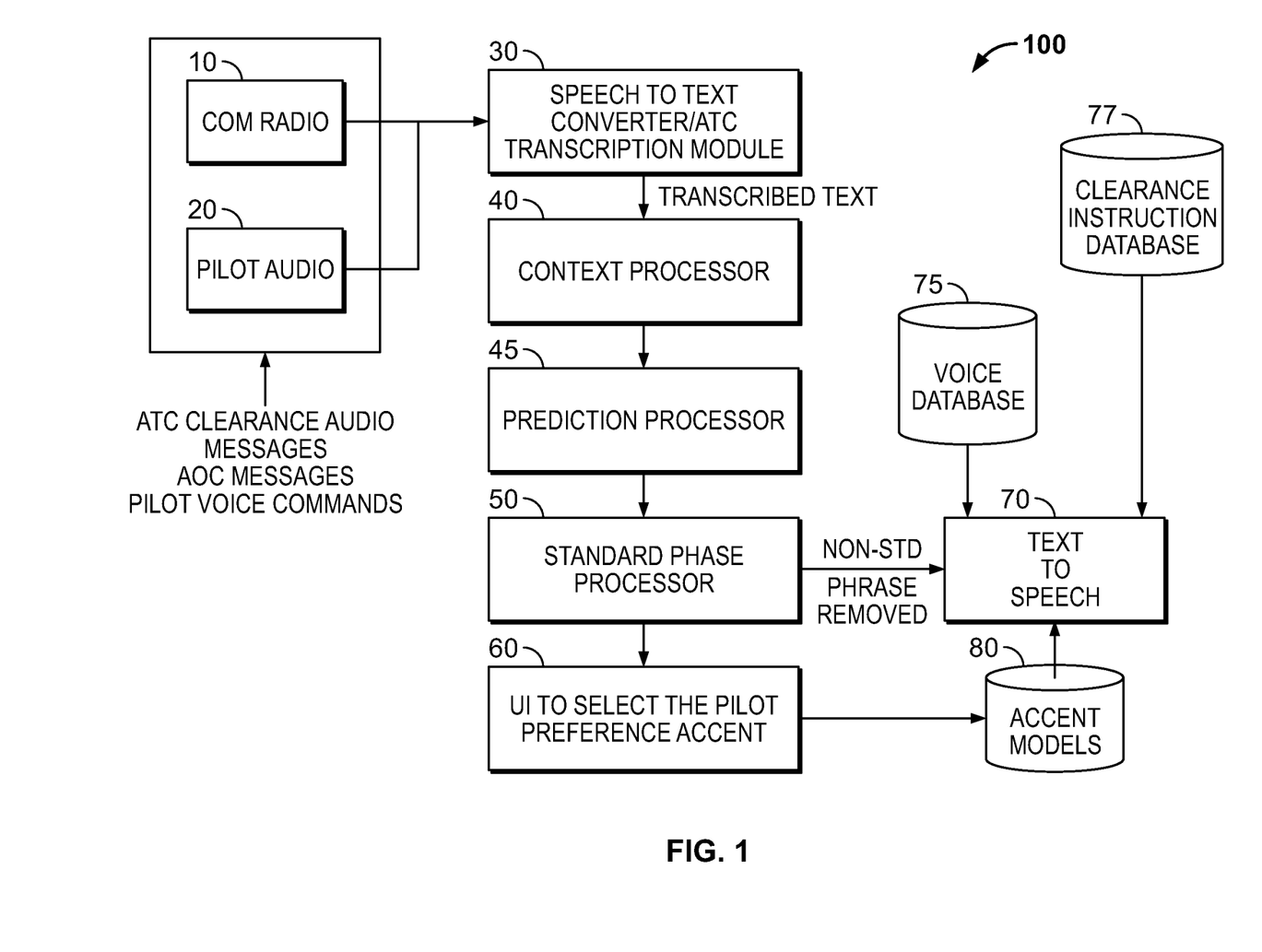
FIG. 1 depicts an exemplary embodiment of a clearance assistance playback system which may be utilized with a vehicle, such as an aircraft in accordance with an embodiment.

FIG. 1 depicts an exemplary embodiment of a clearance assistance playback system 100 which may be utilized with a vehicle, such as an aircraft in accordance with an embodiment. In FIG. 1, clearance instructions or clearance commands are received from the ATC via a COM radio 10 or commands sent from the pilot audio 20. The audio of ATC clearance audio messages, AOC messages, and pilot voice audio are sent to the speech to text converter and ATC transcript module 30 and is transcribed. That is, the speech to text converter and ATC transcript module 30 takes as input radio communications and stores the transcribed text. The transcribed audio is sent to the context processor 40. The context processor 40 may identify a combination of keywords such as "runway", "taxiway" etc. and performs a contextual analysis of historic clearances (i.e. prior clearances stored or received) by associating, via a lookup table or the like, of a same or similar keyword and associated derived value from the prior clearances. Additional keywords may include such terms as "follow traffic", "land behind traffic", "cleared to take off", "cleared to land", "exit via a taxiway", etc. and then append an actual value for each element (i.e. "traffic", "cleared to land", "taxiway" etc.) from the prior clearances.

Next, the prediction module 45 implements another amendment process which can, as an example, be applicable in a case: If the clearance contains keywords which indicates a conditional dependency with other aircraft operations, then the prediction amendment process can apply computation and then append the result of the computation to the clearance. For example: HOLD SHORT, WAIT FOR TRAFFIC and the verbs HOLD, WAIT could indicate a computational value that is time-based. Hence the time can be measured with traffic flight path data and can be appended to the clearance instruction. The standard phrase processor 50 is configured with instructions to replace indirect references by text by performing an element extraction. The element extraction enables the identifying of a list of elements in a set of categories. For example, in a geographic category, the geographical elements may include a runway, taxiway, waypoint, terrain, etc. In a traffic category, the traffic elements may include surrounding traffic in a current context.

Next, the standard phrase processor 50 from a received clearance communication is configured with instructions to identify a set of action elements. The set of action elements includes "Cleared", "Land", "Taxi", "Hold" etc. Also, a set of directional elements may be identified. The directional element set may include directional terms such as "right", "left", "center", "up", "down", "center", "north", "south", "east", "west", "x"-o'clock, etc. The standard phrase processor 50 may also perform a syntax check of a clearance communication instruction that is received and detect if any words do not follow standard ICAO phraseology. If there are any non-standard phrase(s) in the communication instruction, the standard phrase processor 50 may be instructed to replace the non-standard phrase(s) with standardized phraseology and output the standardized phraseology to a text-to-speech (TTS) 70 module. Hence, the non-standard phrases are removed too before receipt by the TTS 70 module. The TTS 70 module can communicate aircraft state(s) to the pilot via an audio panel 20. Also, the TTS 70 module can be configured by different accents from inputs of accent model 80 that have been selected by the pilot using a user interface 60 for manual or automated accent selection.

In various exemplary embodiments, the TTS module 70 is configured by instructions to implement an accent generation process that can be used for each clearance received to change voiced instructions to be sent in the desired accent. The TTS module 70 converts the clearance that has been received into text using solutions (i.e. natural language processing type solutions) of a TTS engine. Then, if the clearance is intended for ownship, stores the clearance in the playback database. Upon a request from the crew for playback, inputs the stored clearance into the TTS Engine to generate audio of a voiced clearance communication. The crew may be given the option to generate the voiced clearance in different accents that are either selected in pre-flight via a user interface or the process is configured with intelligence (i.e. artificial intelligence applications) to derive the accent of crew based on his/her conversation and load the appropriate accent model for TTS module 70.

Figure 2:
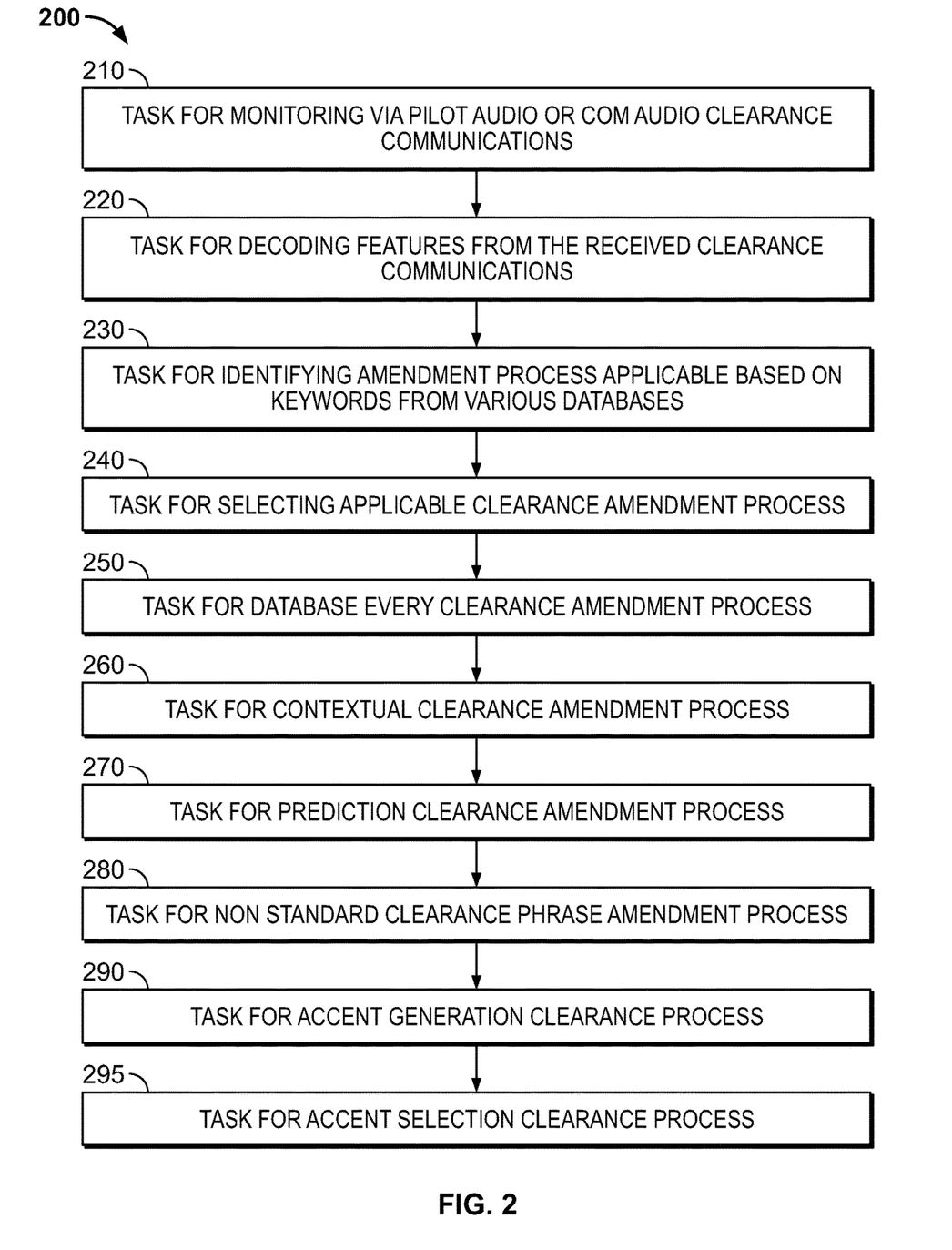
FIG. 2 depicts an exemplary flowchart and where applicable steps which correspond to parts of the system depicted in FIG. 1 of the clearance assistance playback system in accordance with an embodiment.

FIG. 2 depicts an exemplary flowchart 200 and where applicable each step in the process of the exemplary flowchart 200 indicates with portions of the system in FIG. 1 one or more steps which are performed of the clearance assistance playback system 100 of FIG. 1 in accordance with an embodiment. At task 210, the clearance assistance playback system monitors ATC clearance communications and decodes each clearance communication received from the pilot audio or COM audio based on stored voice data retrieved from a voice database 75 and on stored clearance instruction data retrieved from a clearance instruction database 77.

Examples of the clearance communication of instructions or clearance commands with indirect reference and/or non-standard phraseology that may result via the pilot or the COM systems include: "BEHIND AIR CANADA UNITED MAINTENANCE TWELVE"; "CROSSING THREE TWO RIGHT", "YEAH I GUESS AH THEY WANT US TO GET IN POSITION SOMEWHERE I GUESS WE HAVE AN AIRPLANE THAT SLID OFF A RUNWAY TAXIWAY", "JUST HOLD SHORT OF THE RUNWAY FOR NOW YEAH OTHERWISE I DONT KNOW HOW LONG THEY WILL BE HEADING YOUR WAY", "EIGHT TWELVE AFFIRMATIVE HOLD SHORT OF GOLF FOR NOW ER I'M SORRY HOLD SHORT OF THE INTERSECTION", and "NO I WANT YOU TO GIVE WAY TO TRAFFIC AHEAD". It is contemplated that a variety (i.e. unlimited number and types) of communications can be received, and the prior list is simply an exemplary listing of the types of communications that can be expected.

At task 220, the features from the clearance communication are decoded. When the clearance communications are sent to the ownship, or traffic aircraft, the clearance assistance playback system transcribes the voice clearance communication and converts the voiced clearance communication into textual data to derive keywords from the clearance text. At task 230, the clearance assistance playback system identifies, based on the keywords and input from an amendment database, and a query information database the applicable amendment process that should be applied. For example, the contextual amendment, the prediction amendment, and the non-standard phrase amendment process. At task 240, the clearance assistance playback system selects information via an amendment information selector module and applies the amendment process based on rules from an amendment rule database to information from a context information database, a traffic and weather information database, and a query information database. At task 250, the database query amendment process may include the operations of if the clearance has a specific combination of keywords (i.e. "contact", "departure", "takeoff" etc.) and there is no value tagged in the clearance, then applying a query to fetch a value from the query information database in the cockpit system to append to the clearance. At task 260, the contextual amendment process may include the operations of if the clearance has a specific combination of keywords (i.e. "runway", "taxiway" etc.) then applying a contextual analysis of the prior clearances and look up a clearance with the same keyword and associated value to append the keyword with the value found in prior clearances and display it to the crew. At task 270, the prediction amendment process may include the operations of if the clearance contains keywords that indicate a conditional dependency with the other aircraft operation, then applying computation to the clearance. At task 280, a non-standard phrase amendment process can be applied and may include performing element extraction to identify lists of elements of geographic elements or markers such as runways, waypoints, terrain, and traffic elements such as surrounding aircraft in the current context. From a received clearance at task 280, a list of action elements can be identified that include "cleared", "land", "taxi", "hold" etc. and also directional elements of directions and "x" o'clock. Also, a syntax check may be performed of the clearance instruction received to determine if the words communicated fail to follow a standard lingo (i.e. ICAO phraseology) and if not following a standard lingo then replacing the appropriate words with the standardized terms. At task 290, an accent generation process can be applied by converting each clearance communication to text, determining if the clearance communication is intended for the ownship, and storing the clearance communication. Then, upon request from the pilot or crew, playback the stored clearance communication via the TTS module for a voiced communication to the pilot or crew. Also, at task 295, an accent selection may have occurred at the pre-flight or when voiced by the TTS module upon an appropriate accent type selection by the pilot or crew or an automated intelligent application selection. Upon selection, the appropriate accent model is loaded and applied to the TTS module for voicing in a selected accent the clearance communication.

The following table below includes examples of the use of the described different amendment methods and illustrates an exemplary process to replace the indirect or incomplete references used in a clearance communication.

| Clearance as received from ATC and decoded by voice engine | Clearance after substitution by-post-processing | Amendment category |
|---|---|---|
| JET EIGHT FORTY-TWO BOSTON TOWER YOU'RE FOLLOWING TRAFFIC ON A THREE MILE FINAL RUNWAY ZERO AT ONE ONE GUSTS ARE ONE NINER TRAFFIC | TRAFFIC BA1752 and RUNWAY 28 | Contextual |
| | TRAFFIC UNH752 | Contextual |
| JET BLUE EIGHT EIGHTY-NINE CONTACT DEPARTURE | CONTACT DEPARTURE 121.49 | Database query |

| Clearance as received from ATC and decoded by voice engine | Clearance after substitution by-post-processing | Amendment category |
|---|---|---|
| JET BLUE TWENTY SEVEN SIXTY-FIVE RUNWAY TWO SEVEN LINE UP AND WAIT TRAFFIC WILL BE LANDING AT RUNWAY THREE THREE LEFT | WAIT TRAFFIC GY123 2 minutes | Prediction |
| ONE TWO NINER EIGHT NINER HOTEL DEER VALLEY TOWER HOLD SHORT OF RUNWAY TWO FIVE | HOLD SHORT 2 minutes | Prediction |
| OKAY CROSS ONE NINE AT CHARLIE FOR TWO CHARLIE HOTEL | RUNWAY 19 | Contextual |
| BACKTRACK ONE EIGHT LINE UP RUNWAY | RUNWAY 18 RUNWAY [NUMBER] | Contextual Contextual |
| BRICKYARD THIRTY-FIVE EIGHTY-TWO CONTACT NEW YORK CENTER | CONTACT NEW YORK 124.62 | Database query |
| 9ADDB, CORRECT, REPORT DOWNWIND | report right-hand downwind | Contextual |
| 9ADKH, CLEARED FOR TOUCH-AND-GO | RUNWAY 05 | Contextual |
| BAW 234, EXPECT 2 MINUTES DELAY, B737 TAXING BEHIND YOU | TAXIING BA1752 and time in UTC | Prediction and contextual |
| BAW 234, HOLD POSITION | HOLD POSITION 2 minutes | Prediction |

As shown in the above table, the playback assistance system may highlight the changes in the text in line with the original text (i.e. the substituted text is present in an amendment form with highlights enabling the pilot to assess the changes for correctness).

Figure 3:
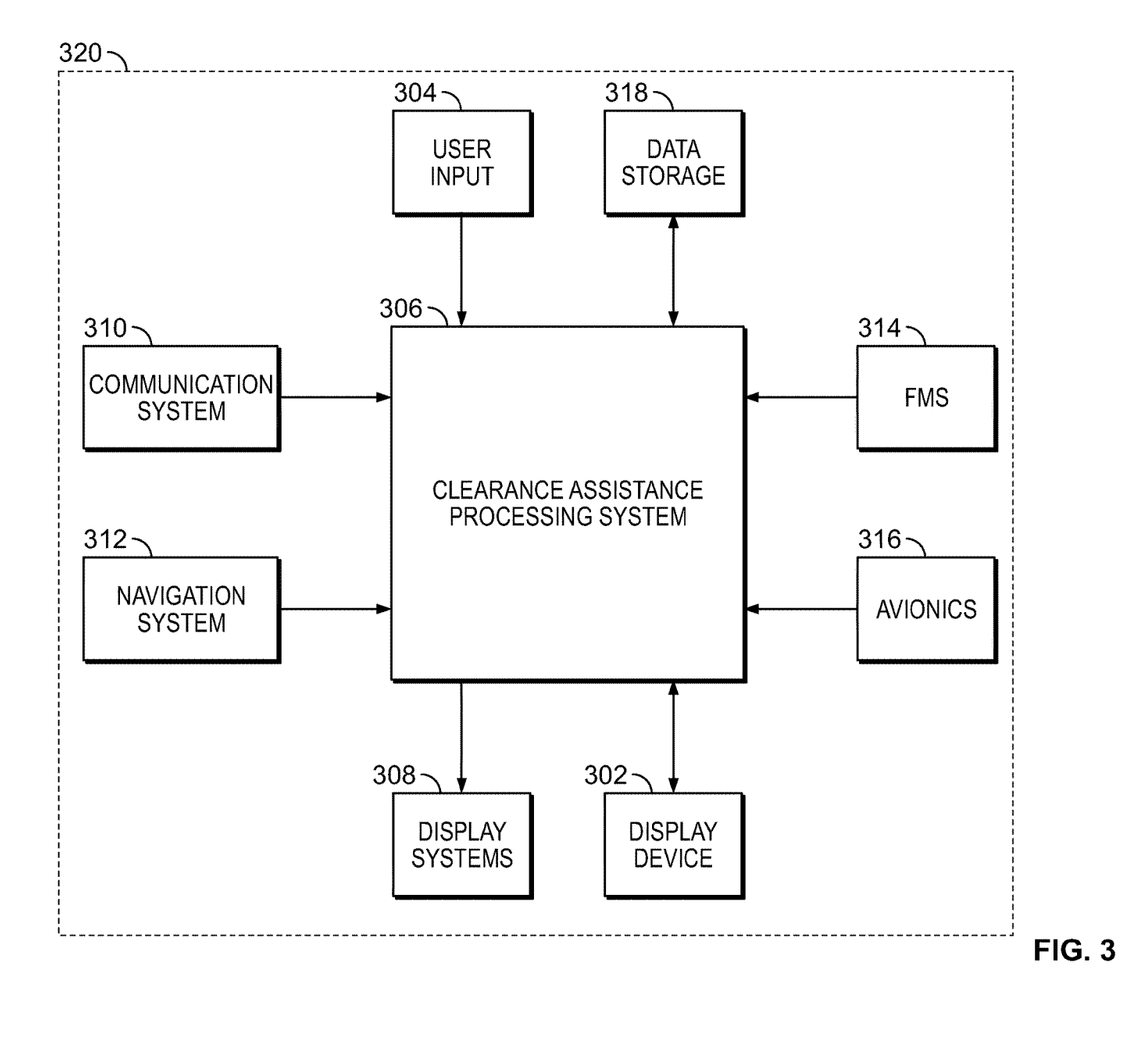
FIG. 3 is an exemplary diagram illustrating a clearance assistance processing process suitable for implementation by the aircraft system of FIG. 1 in accordance with an embodiment.

FIG. 3 depicts an exemplary diagram of the architecture of the clearance assistance playback system in accordance with an embodiment. In FIG. 3, in an exemplary embodiment, the system of the aircraft 320 includes, without limitation, a display device 302, one or more user input devices 304, a clearance assistance processing system 306, a display system 308, a communications system 310, a navigation system 312, a flight management system (FMS) 314, one or more avionics systems 316, and a data storage element 318 suitably configured to support the operation of the system in the aircraft 320, as described in greater detail below.

In exemplary embodiments, the display device 302 is realized as an electronic display capable of graphically displaying flight information or other data associated with the operation of the aircraft 320 under control of the display system 308 and/or the clearance assistance processing system 306. In this regard, the display device 302 is coupled to the display system 308 and the clearance assistance processing system 306, wherein the clearance assistance processing system 306 and the display system 308 are cooperatively configured to display, render, or otherwise convey one or more graphical representations or images associated with the operation of the aircraft 320 on the display device 302. The user input device 304 is coupled to the clearance assistance processing system 306, and the user input device 304 and the clearance assistance processing system 306 are cooperatively configured to allow a user (e.g., a pilot, co-pilot, or crew member) to interact with the display device 302 and/or other elements of the system in aircraft 320, as described in greater detail below. Depending on the embodiment, the user input device(s) 304 may be realized as a keypad, touchpad, keyboard, mouse, touch panel (or touchscreen), joystick, knob, line select key or another suitable device adapted to receive input from a user. In some embodiments, the user input device 304 includes or is realized as an audio input device, such as a microphone, audio transducer, audio sensor, or the like, that is adapted to allow a user to provide audio input (i.e. clearance communication for amendment from the pilot) to the system in aircraft 320 in a "hands-free" manner without requiring the user to move his or her hands, eyes and/or head to interact with the system in aircraft 320.

The clearance assistance processing system 306 generally represents the hardware, software, and/or firmware components configured to facilitate communications and/or interaction between the elements of the system in aircraft 320 and perform additional tasks and/or functions to support the operation of the system in aircraft 320, as described in greater detail below. Depending on the embodiment, the clearance assistance processing system 306 may be implemented or realized with a general-purpose processor, a content addressable memory, a digital signal processor, an application-specific integrated circuit, a field-programmable gate array, any suitable programmable logic device, discrete gate or transistor logic, processing core, discrete hardware components, or any combination thereof, designed to perform the functions described herein. The clearance assistance processing system 306 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 306 includes processing logic that may be configured to carry out the functions, techniques, and processing tasks associated with the operation of the system in aircraft 320, as described in greater detail below. Furthermore, the steps of a method or algorithm described in connection with the embodiments disclosed herein may be embodied directly in hardware, in firmware, in a software module executed by the clearance assistance processing system 306, or in any practical combination thereof. For example, in one or more embodiments, the clearance assistance processing system 306 includes or otherwise accesses a data storage element (or memory), which may be realized as any sort of non-transitory short- or long-term storage media capable of storing programming instructions for execution by the clearance assistance processing system 306. The code or other computer-executable programming instructions, when read and executed by the clearance assistance processing system 306, cause the processing system 306 to support or otherwise perform certain tasks, operations, functions, and/or processes described herein.

The display system 308 generally represents the hardware, software, and/or firmware components configured to control the display and/or rendering of one or more navigational maps and/or other displays about the operation of the aircraft 320 and/or onboard systems 310, 312, 314, 316 on the display device 302. In this regard, the display system 308 may access or include one or more databases suitably configured to support operations of the display system 308, such as, for example, a terrain database, an obstacle database, a navigational database, a geopolitical database, a terminal airspace database, a special use airspace database, or other information for rendering and/or displaying navigational maps and/or other content on the display device 302.

In exemplary embodiments, the aircraft 320 includes a data storage element 318, which contains information for clearance monitoring and decoding process, and clearance amendment processes that may include for clearance monitoring and decoding the following types of information: voice data, instruction data, and keyword data; and for clearance amendment processes, the following types information: amendment data, context information data, amendment rule data, database information data, and traffic and weather data.

In an alternative exemplary embodiment, the data storage element 318 may be connected via the cloud or networked with multiple separate database repository such as a voice database, an instruction database, a keyword database, an amendment database, a context information database, an amendment rule database, a traffic and weather database and/or a data information database. Also, other data or databases may be coupled that include information such as aircraft procedure information (or instrument procedure information) for a plurality of airports. Further, the data storage element 318 may store information enabling maintenance of an association between the aircraft procedure information and the corresponding airports. Depending on the embodiment, the data storage element 318 may be physically realized using RAM, ROM memory, flash memory, registers, a hard disk, or another suitable data storage medium known in the art or any suitable combination thereof, and may be enabled with cloud connectivity for updates and for accessing additional databases. As used herein, aircraft procedure information should be understood as a set of operating parameters, constraints, or instructions associated with a particular aircraft action (e.g., approach, departure, arrival, climbing, and the like) that may be undertaken by the aircraft 320 at or in the vicinity of a particular airport.

Each airport may have one or more predefined aircraft procedures associated therewith, wherein the aircraft procedure information for each aircraft procedure at each respective airport may be maintained by the data storage element 318. Still referring to FIG. 3, in an exemplary embodiment, the clearance assistance processing system 306 is coupled to the navigation system 312, which is configured to provide real-time navigational data and/or information regarding the operation of the aircraft 320. The navigation system 312 is also capable of obtaining or otherwise determining the heading of the aircraft 320 (i.e., the direction the aircraft is traveling in relative to some reference). In the illustrated embodiment, the clearance assistance processing system 306 is also coupled to the communications system 310, which is configured to support communications to and/or from the aircraft 320. For example, the communications system 310 may support communications between the aircraft 320 and air traffic control or another suitable command center or ground location. In this regard, the communications system 310 may be realized using a radio communication system and/or another suitable data link system.

In an exemplary embodiment, the clearance assistance processing system 306 is also coupled to the FMS 314, which is coupled to the navigation system 312, the communications system 310, and one or more additional avionics systems 316 to support navigation, flight planning, and other aircraft control functions conventionally, as well as to provide real-time data and/or information regarding the operational status of the aircraft 320 to the clearance assistance processing system 306. Although FIG. 3 depicts a single avionics system 316, in practice, and/or systems of the aircraft 320 will likely include numerous avionics systems for obtaining and/or providing real-time flight-related information that may be displayed on the display device 302 or otherwise provided to a user (e.g., a pilot, a co-pilot, or crew member).

It should be understood that FIG. 3 is a simplified representation of the system of the aircraft 320 for purposes of explanation and ease of description and FIG. 3 is not intended to limit the application or scope of the subject matter described herein in any way. It should be appreciated that although FIG. 3 shows the display device 302, the user input device 304, and the clearance assistance processing system 306 as being located onboard the aircraft 320 (e.g., in the cockpit), in practice, one or more of the display device 302, the user input device 304, and/or the clearance assistance processing system 306 may be located outside the aircraft 320 (e.g., on the ground as part of an air traffic control center or another command center) and communicatively coupled to the remaining elements of the system of the aircraft 320 (e.g., via a data link and/or communications system 310). Similarly, in some embodiments, the data storage element 318 may be located outside the aircraft 320 and communicatively coupled to the clearance assistance processing system 306 via a data link and/or communications system 310.

Figure 4:
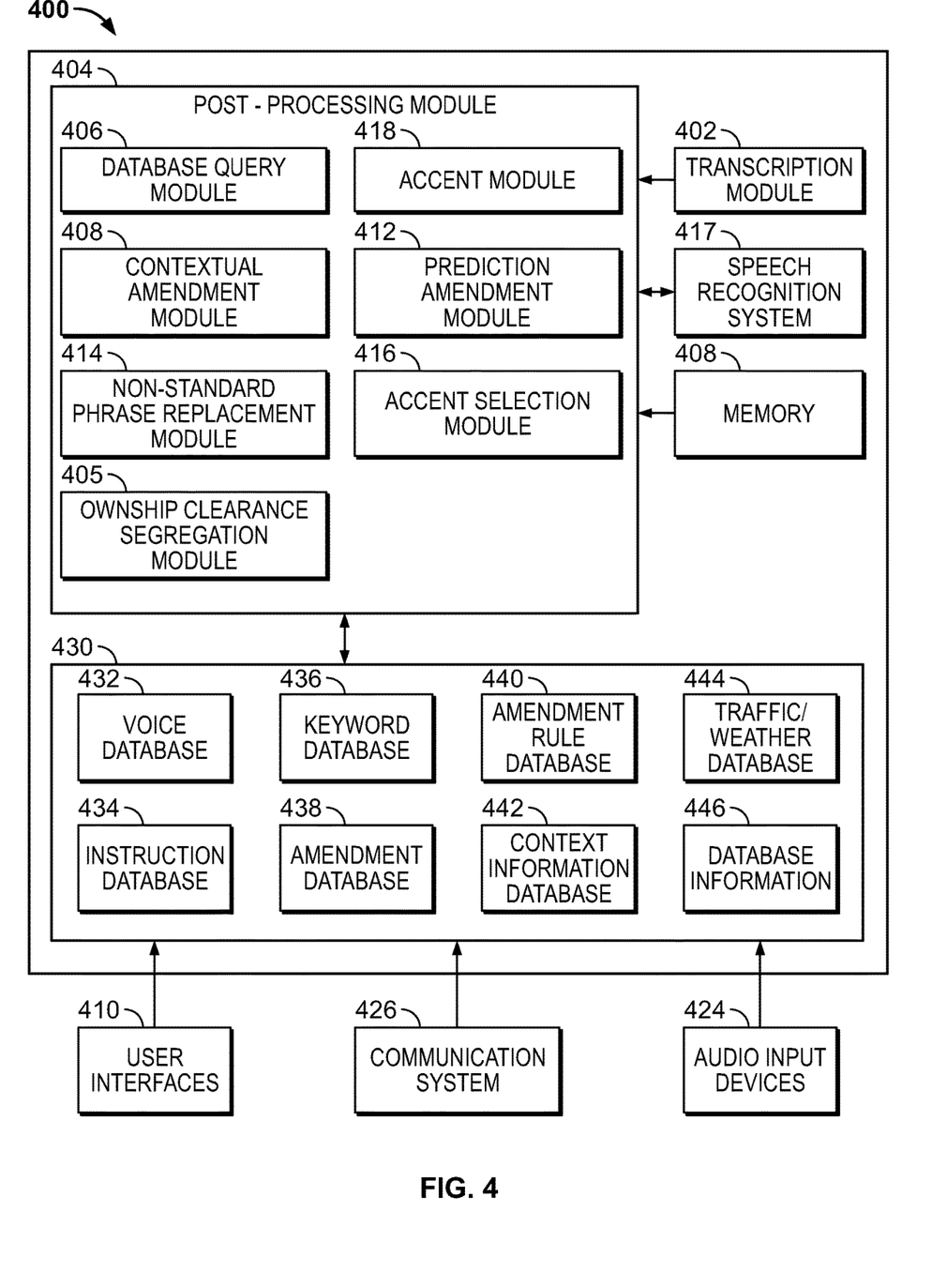
FIG. 4 is an exemplary diagram of the architecture of the clearance assistance processing system of FIG. 3 in accordance with an embodiment.

FIG. 4 depicts an exemplary embodiment of a clearance assistance processing system 400 for identifying features in recorded clearance communications, and for amending the clearance communications to assist the crew in-flight operations. The illustrated clearance assistance processing system 400 includes transcription module 402, a post-processing intelligence module 404, ownship clearance segregation module 405, native accent selection module 418, and accent module 416. Also, there is illustrated speech recognition module 417 for use with the transcription module 402 to transcribe the text, databases 430, an audio input device 424 (or microphone), one or more communications systems 426, a data storage element 408 (or memory), and one or more output user interfaces 410.

The post-processing module 404 generally represents the clearance assistance processing system of the clearance assistance processing system 400 and may include any sort of hardware, firmware, circuitry and/or logic components or a combination thereof that is coupled to the microphone 404 and communications system(s) 426 to receive or otherwise obtain clearance communications and decode the clearance communications for the clearance amendment processing. Depending on the embodiment, the -post-processing module 404 may be implemented or realized with a general-purpose processor, a microprocessor, a controller, a microcontroller, a state machine, a content addressable memory, an application-specific integrated circuit, a field-programmable gate array, any suitable programmable logic device, etc. In exemplary embodiments, the post-processing module 404 may also include or otherwise access a data storage element or memory (e.g., memory 408), including any sort of RAM, read-only memory (ROM), flash memory, or any other short or long term storage media or other non-transitory computer-readable media, which is capable of storing programming instructions for execution by the -post-processing module 404. The computer-executable programming instructions, when read and executed by the post-processing module 404, cause the post-processing module 404 to perform or otherwise support the tasks, operations, functions, and processes described herein.

The audio input device 424 generally represents any sort of microphone, audio transducer, an audio sensor, or the like capable of receiving voice or speech input at the location of the -post-processing module 404. In this regard, in one or more embodiments, the audio input device 424 is realized as a microphone onboard the aircraft to receive voice or speech annunciated by a pilot or other crewmember onboard the aircraft inside the cockpit of the aircraft. The communications system(s) 426 (e.g., communications system 310 of FIG. 3) generally represent the avionics systems capable of receiving clearance communications from other sources, such as, for example, other aircraft, an air traffic controller, or the like. Depending on the embodiment, the communications system(s) 426 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In the illustrated embodiment, the computer-executable programming instructions executed by post-processing module 404 cause the post-processing module 404 to generate, execute, or otherwise implement a database query module 406, contextual amendment module 408, a prediction amendment module 412, a non-standard phrase module 414, an accent generation module 416, and an accent module 418. The post-processing module 404 identifies based on the keywords and input from the databases 430 of the voice database 432, the keyword database 436, traffic and weather database 444, the instruction database 434, the amendment database 435, the information database 446, and the context database 442. a contextual amendment, and a prediction amendment. The post-processing module 404 may select information and apply various amendment process based on amendment rules. The various amendment process applicable may include applications from the database query module 406 that may include the operations of if the clearance has a specific combination of keywords (i.e. "contact", "departure", "takeoff" etc.) and there is no value tagged in the clearance, then applying a use query to fetch a value from the query information database in the cockpit system to append to the clearance. Also, amendment process may be applied from the contextual amendment module 408 of if the clearance has a specific combination of keywords (i.e. "runway", "taxiway" etc.) then applying a contextual analysis of the prior clearances and look up a clearance (i.e. stored in memory 408) with the same keyword and an associated value to append the keyword with value found in prior clearances and display it to the crew. Also, applicable amendment process can include applications from the prediction amendment module 412 of if the clearance contains keywords which indicate a conditional dependency with the other aircraft operation, then applying computation to the clearance, and applications from the nonstandard phrase module 414 of performing element extraction to identify lists of elements of geographic elements or markers such as runways, waypoints, terrain, and traffic elements such as surrounding aircraft in the current context. Additionally, a native accent selection module 416 can be provided either as input by the pilot via user interfaces 410 or alternately can be inferred from the pilot communications with the ATC. Also, an accent model 418 may be implemented in conjunction with the ATC transcribed text and output to the TTS engine of the transcription module 402. The port processing module 404 via intelligent applications may convert the audio to the desired accent in playback by applying the accent model 418, and highlight changes in the decoded text when presented to the pilot or crew so the pilot or crew can review the changed or replaced text to assess the textual changes in the clearance communications presented.

In this regard, the post-processing module 404 may implement or otherwise support a speech recognition system 417 (or voice recognition engine) or another speech-to-text system to assist in the speech to audio conversions. In one or more embodiments, the post-processing module 404 may also mark, tag, or otherwise associate a transcribed textual representation of a clearance communication with an identifier of amendments or other indicia of changes to the clearance communication or instruction.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system for playback clearance assistance, the system comprising:
a processing system configured to:
in response to receipt of a voice clearance communication comprising a clearance message, decode the clearance message to identify features contained within the clearance message related to a command instruction or clearance data for a flight;
determine at least one applicable clearance message amendment solution for use to amend the clearance message from a set of applicable clearance message amendment solutions, wherein the applicable clearance amendment solution is determined based on keywords retrieved from a plurality of databases comprising at least contextual and prior clearance message data; and
apply the applicable clearance message amendment solution to append keywords to the clearance message to generate an appended clearance message that reduces ambiguity in the clearance message resulting from at least missing value data, non-standard terminology or incomplete message information.

2. The system of claim 1, further comprising:
the processing system configured to:
in response to a determination that the clearance message contains a specific combination of keywords and there is no value data is tagged to a clearance message, apply a database query amendment solution to fetch a specific value data from a database containing value data derived from aircraft cockpit systems; and
append the clearance message with the fetched value data to reduce the ambiguity caused by the no value data contained within the clearance message.

3. The system of claim 1, further comprising:
the processing system configured to:
in response to a determination that the clearance message contains a specific combination of keywords, apply a contextual analysis of one or more prior clearance messages to look-up a clearance message with similar or same keywords and an associated value data; and
append the clearance message with the associated looked-up value data to display on a cockpit display.

4. The system of claim 1, further comprising:
the processing system configured to:
in response to a determination that the clearance message contains a set of keywords indicative of a conditional dependency with another aircraft, apply a computation solution to generate a computation value based on the conditional dependency with the another aircraft; and
append the computation value to the clearance message to display on a cockpit display.

5. The system of claim 1, further comprising:
the processing system configured to:
perform a syntax check of the command instruction contained within the clearance message to determine whether the command instruction contains non-standard phrases by:
extracting elements in the command instruction, and
identifying one or more element types in a set comprising at least geographic and traffic elements contained in the command instruction; and
replace the non-standard phrases with standard phrases based on geographic and traffic elements to reduce the ambiguity caused by use of the non-standard phrases within the clearance message.

6. The system of claim 1, further comprising:
the processing system configured to:
perform a syntax check of the command instruction contained within the clearance message to determine whether the command instruction contains non-standard phrases by:
extracting elements in the command instruction, and
identifying one or more element types in a set comprising at least action and directional elements contained in the command instruction; and
replace the non-standard phrases with standard phrases based on the action and directional elements to reduce the ambiguity caused by use of the non-standard phrases within the clearance message.

7. The system of claim 1, further comprising:
the processing module configured to:
in response to receipt of a voice clearance communication comprising a clearance message, convert the clearance message into text using a speech engine;
in response to a request for playback of the clearance message, optionally generate in a different accent selected either pre-flight or by an intelligent application, the playback of the clearance message.

8. The system of claim 7, wherein the intelligent application selects the different accents or derives a different accent for a clearance message playback based at least on ATC audio conversations.

9. A method for playback clearance assistance, the method comprising:
decoding, by a processor, a clearance message to identify features contained within the clearance message related to a command instruction or clearance data for a flight;
determining, by the processor, at least one applicable clearance message amendment solution for use for amending the clearance message from a set of applicable clearance message amendment solutions based on keywords retrieved from a plurality of databases comprising at least contextual and prior clearance message data; and
applying, by the processor, the applicable clearance message amendment solution for appending keywords to the clearance message for generating an appended clearance message thereby reducing ambiguity in the clearance message resulting from at least missing value data, non-standard terminology or incomplete message information.

10. The method of claim 9, further comprising:
determining, by the processor, that the clearance message contains a specific combination of keywords and there is no value data tagged to the clearance message;
applying, by the processor, a database query amendment solution for fetching a specific value data from a database containing value data derived from aircraft cockpit systems; and
appending, by the processor, the clearance message with the fetched value data thereby reducing the ambiguity caused by the no value data contained within the clearance message.

11. The method of claim 9, further comprising:
determining, by the processor, that the clearance message contains a specific combination of keywords;
applying, by the processor, a contextual analysis of one or more prior clearance messages to look-up a clearance message with similar or same keywords and an associated value data; and
appending, by the processor, the clearance message with the associated looked-up value data to display on a cockpit display.

12. The method of claim 9, further comprising:
determining, by the processor, that the clearance message contains a set of keywords indicative of a conditional dependency with another aircraft;
applying, by the processor, a computation solution for generating a computation value based on the conditional dependency with the another aircraft; and
appending, by the processor, the computation value to the clearance message to display on a cockpit display.

13. The method of claim 9, further comprising:
performing, by the processor, a syntax check of the command instruction contained within the clearance message for determining whether the command instruction contains non-standard phrases;
extracting, by the processor, elements in the command instruction;
identifying, by the processor, one or more element types in a set comprising at least geographic and traffic elements contained in the command instruction; and
replacing, by the processor, the non-standard phrases with standard phrases based on geographic and traffic elements for reducing the ambiguity caused by use of the non-standard phrases within the clearance message.

14. The method of claim 9, further comprising:
performing, by the processor, a syntax check of the command instruction contained within the clearance message for determining whether the command instruction contains non-standard phrases;
extracting, by the processor, elements in the command instruction;
identifying, by the processor, one or more element types in a set comprising at least action and directional elements contained in the command instruction; and
replacing, by the processor, the non-standard phrases with standard phrases based on the action and directional elements to reduce the ambiguity caused by use of the non-standard phrases within the clearance message.

15. The method of claim 9, further comprising:
converting, by the processor, the clearance message into text using a speech engine; and
optionally generating in a different accent selected either pre-flight or by an intelligent application, a playback of the clearance message.

16. The method of claim 15, wherein the intelligent application selects the different accents or derives a different accent for a clearance message playback based at least on ATC audio conversations.

17. A method of playback of a pilot's voice communications in a preferred accent, comprising:
in response to an inference of a pilot's voice communications with an air traffic controller (ATC) or with other personnel, obtaining by a processing system a plurality of audio segments via an audio input device onboard an ownship; and
obtaining, by the processing system, from pilot input or based on the pilot's voice communications a preferred accent for playback of the audio segment to the pilot wherein the obtaining of the preferred accent further comprises:
obtaining the preferred accent or a different accent either during a pre-flight period by pilot selection or by monitoring prior pilot communications to determine via intelligent applications of the processing system based on the plurality of audio segments retrieved in prior pilot communications, the different or preferred accent whereby an appropriate accent module consistent with the different or preferred accent is installed by the processing system.

18. The method of claim 17, further comprising:
obtaining a respective textual representation of each respective audio segment contained in the plurality of audio segments by voice recognition on the respective textual representation of the respective audio segment to identify content related to flight operations associated with the respective audio segment; and
classifying, by the processing system, one or more respective textual representations derived from each audio segment of the plurality of audio segments into one or more of a plurality of categories based at least in part on content extracted from the textual representation wherein the content is related to a flight operation described in the pilot's voice communication found in the audio segment.

19. The method of claim 18, further comprising:
in response to a determination that at least incomplete or non-standardized textual information exists in the respective textual representation, inserting or replacing by intelligent algorithms of the processing system, textual information to complete the respective textual representation wherein the inserted or replaced textual information is standardized textual information; and
playing, a playback of the audio segment based on the complete textual representation with highlights wherein the playback of the audio segment is executed in the preferred accent of the pilot.

20. The method of claim 19, the processing system configured with the intelligent algorithm further comprising:
applying contextual or predictive solutions to determine whether an incomplete or non-standardized textual information is found in the respective textual representation; and
communicating with a database containing contextual and predictive data for inserting or replacing textual information to complete the respective textual representation wherein the inserted or replaced textual information is either standardized textual information or non-standardized textual information based on factors associated with the contextual and predictive data.

* * * * *